United States Patent [19]

White

[11] Patent Number: 5,266,066
[45] Date of Patent: Nov. 30, 1993

[54] SPRING BLADE CHAIN TENSIONER

[75] Inventor: David C. White, Dryden, N.Y.

[73] Assignee: Borg-Warner Automative, Inc., Sterling Heights, Mich.

[21] Appl. No.: 933,987

[22] Filed: Aug. 21, 1992

[51] Int. Cl.⁵ .......................... F16H 7/08; F16H 7/18
[52] U.S. Cl. ...................................... 474/111; 474/140
[58] Field of Search ............... 474/101, 109, 111, 133, 474/135, 138, 140

[56] References Cited

U.S. PATENT DOCUMENTS

| | | | |
|---|---|---|---|
| 2,129,107 | 9/1938 | Taylor | 474/111 X |
| 2,141,118 | 12/1938 | Weller | 474/111 |
| 2,210,276 | 8/1940 | Bremer | 474/111 X |
| 3,276,282 | 10/1966 | Duncan | 474/111 |
| 3,463,025 | 8/1969 | Turner et al. | 474/111 |
| 3,490,302 | 1/1970 | Turner et al. | 74/242.11 |
| 4,921,472 | 5/1990 | Young | 474/111 |
| 5,055,088 | 10/1991 | Cradduck et al. | 474/111 |

FOREIGN PATENT DOCUMENTS

| | | |
|---|---|---|
| 0055166 | 6/1982 | France . |
| 57-134054 | 8/1982 | Japan . |
| 907983 | 10/1962 | United Kingdom ................ 474/111 |

Primary Examiner—Thuy M. Bui
Assistant Examiner—Roger J. Schoeppel
Attorney, Agent, or Firm—Willian Brinks Olds

[57] ABSTRACT

A blade-type chain tensioner constructed from a plastic shoe and a blade spring. The shoe is slightly arcuate and has a pocket along its concave side. At each end of the pocket is a cavity. The blade spring is substantially more arcuate than the shoe and is rectangular. The blade spring is further dimensioned to allow each end of the blade spring to be mounted in the pocket having an end in each cavity at the end of a shoe. Through this configuration the blade spring is mechanically interlocked with the shoe without the use of fasteners or cutouts. The blade spring places a load on the shoe and causing the shoe to creep at an elevated temperature and thereby provide tension to a chain.

16 Claims, 2 Drawing Sheets

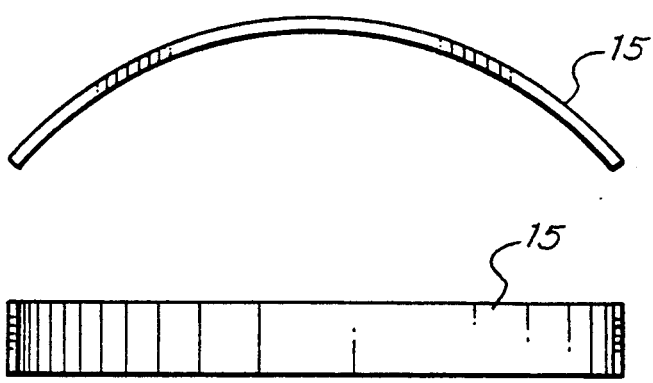
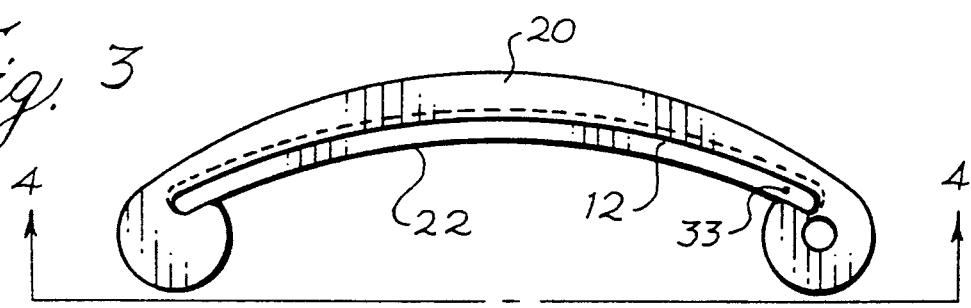
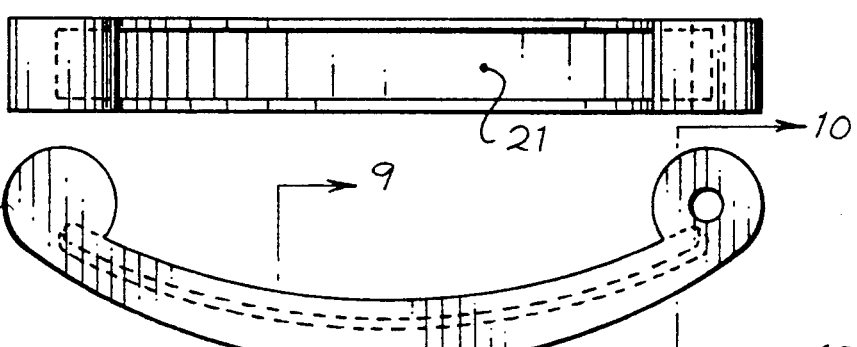
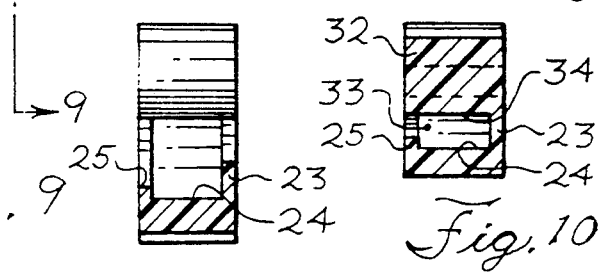

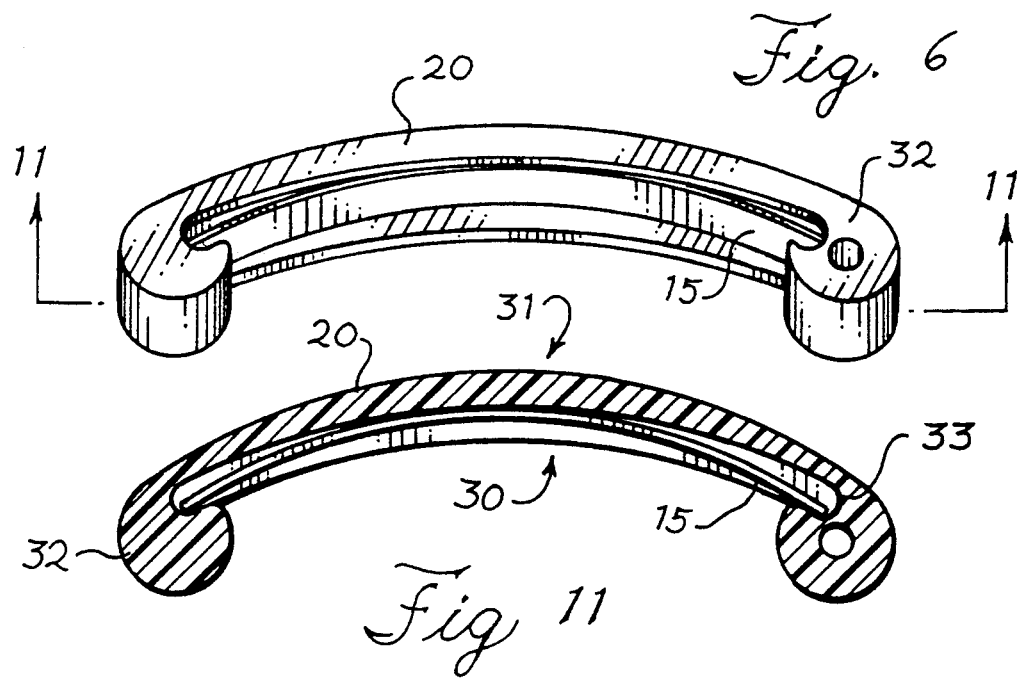
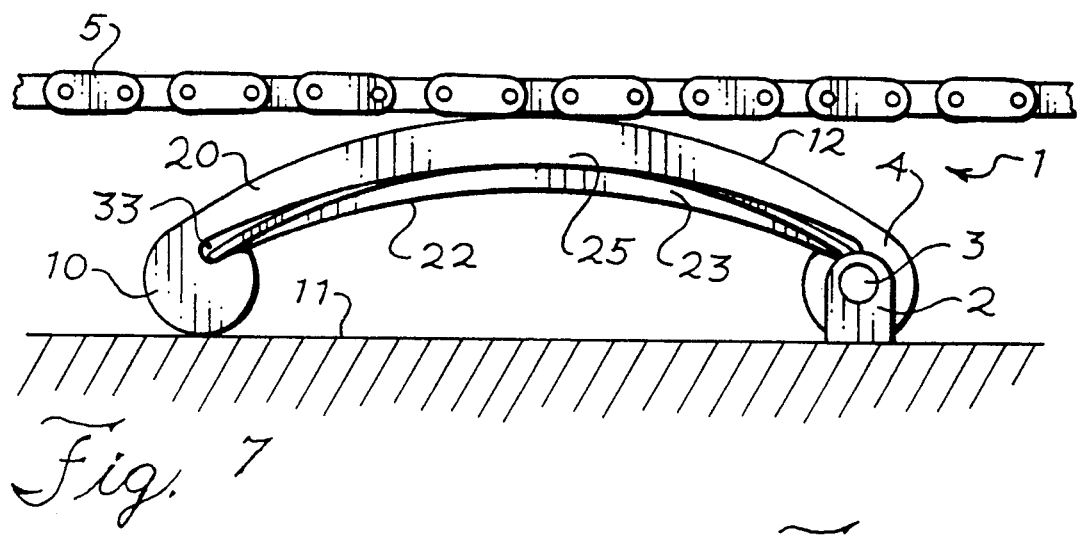

SPRING BLADE CHAIN TENSIONER

FIELD OF THE INVENTION

This invention relates to tensioners used with chain drives in automotive timing applications and more particularly to a blade-type chain tensioner in which a blade spring is interlocked with a deformable shoe through a pocket in the shoe.

BACKGROUND OF THE INVENTION

Tensioning devices are used as a control device for a power transmission chain, or any similar power transmission devices, as the chain travels between a plurality of sprockets. Generally, it is important to impart and maintain a certain degree of tension to the chain to prevent noises, slippage, or the unmeshing of teeth (in cases of a toothed belt). Prevention of such slippage is especially important in the case of a chain driven camshaft in an internal combustion engine because slippage will throw off the camshaft timing by several degrees, possibly rendering the engine inoperative or causing damage. However, in the harsh environment in which an internal combustion engine operates, belt tension can vary between excessively high or low levels as a result of the wide variations in temperature and differences between the coefficients of linear expansion among the various parts of the engine, including the chain and the tensioner. Moreover, wear to the chain components, during prolonged use, can result in a decrease in the tension of the chain. In addition, cam shaft and crank shaft induced torsional vibrations cause belt tension to vary considerably. This tension variation results in chain elongation, determined by belt stiffness.

Generally, blade-type chain tensioners utilize a blade spring interlocked under tension with a shoe to provide tension to a chain. Specifically the blade spring is arcuate in shape and the shoe is relatively flat. The shoe further is constructed from a material which will deform or "creep" upon experiencing a load at a high temperature. The blade spring is bent to correspond to the shape of the shoe and interlocked therewith. Through the bias of the blade spring, which wishes to return to its original, more arcuate shape, a load is applied to the shoe. Thus as the operation of the engine causes the temperature of the shoe to increase, the load from the blade spring causes the shoe to deform to a more arcuate shape. Through such deformation tension is provided to a chain. Specifically, the blade assembly is positioned relative to the chain so that as the shoe becomes more arcuate it bears upon a span of chain thereby increasing chain tension. The present invention concerns a blade-type chain tensioner having an improved mounting for the blade spring to the shoe.

Past tensioners have mounted the blade spring to the shoe through a pin and slot structure. Turner et al. U.S. Pat. No. 3,490,302 entitled "Chain Tensioner" discloses a blade assembly having a shoe made of a material that will "creep" under a load at an elevated temperature. The load to the shoe is provided by a blade spring continuously bearing against the shoe. The blade spring is mounted to mechanically interlock with, and thereby provide a load to, the shoe through a hole and pin combination. Specifically, the blade spring has a triangular aperture at one end that must be aligned with a triangular projection on the shoe. When the triangular projection of the shoe mates with the triangular aperture of the blade spring, a pin is inserted into a bore in the projection to mechanically interlock the blade spring and the shoe.

Another construction for mounting a blade spring to a shoe is shown in Young et al. U.S. Pat. No. 4,921,472 entitled "Chain Tensioner," incorporated herein by reference. This reference discloses a blade-type tensioner having a blade spring mechanically interlocked with a shoe through a passageway in the end of the shoe. Specifically, the shoe has a passageway having a shoulder and a chamber into which the blade spring fits. This configuration allows a first end of the blade spring to be slid through the passageway, at one end of the shoe, until it engages a chamber at the other end of the shoe. The second end of the blade spring is secured in tension to the shoe by a shoulder in the passageway. Slots cut into each end of the blade spring may further be used to secure the blade spring in the shoe. Through such a configuration, the blade spring is mechanically interlocked with the shoe by only the geometrical configuration of the parts.

A further construction for mounting a blade spring to a shoe is disclosed in Cradduck et al. U.S. Pat No. 5,055,088 entitled "Spring Blade Chain Tensioner," incorporated herein by reference. This reference discloses a blade-type tensioner which utilizes a plurality of blade springs interlocked with a plastic shoe through a passageway in the shoe and fastened using a pin.

These prior art blade-type chain tensioners, however, have used blade springs having complicated shapes or required the use of separate fasteners, such as pins, or both to interlock the blade spring and the shoe. These features add to the cost of manufacturing and installing the blade spring to the shoe. Moreover, any cutouts in the blade spring may create a stress riser i.e., an area of stress concentration, which could adversely impact the reliability of the chain tensioner. In addition, such cutouts require additional steps in the manufacturing process and thus increase manufacturing expenses.

Accordingly, it is an object of the present invention to provide a blade-type chain tensioner in which a blade spring is mounted to a shoe and provides a load thereto without the use of any cut-outs in the blade spring or any separate fasteners.

SUMMARY OF THE INVENTION

According to the invention, a blade-type chain tensioner is constructed from a blade spring and plastic shoe. Specifically, the blade spring is constructed from a simple rectangular metal band bent into an arcuate shape and dimensioned to correspond to a pocket in the shoe.

The shoe is relatively flatter than the blade spring and made of a synthetic material, such as nylon, which will "creep" under elevated load and temperature. A pocket is located across the concave side of the shoe. Located at each end of the pocket is a cavity. The blade spring is mechanically interlocked with the shoe by positioning the blade spring in the pocket and each end of the blade spring into a cavity. In such a manner the blade spring is mechanically interlocked to provide a load to the shoe without the use of any fasteners or cut-outs in the blade spring, which could provide an area in which stress risers would concentrate. Stress risers create areas of stress concentration which may lead to premature blade spring failure, thus rendering the entire chain tensioner ineffective. Moreover because the blade spring is encapsulated in the pocket by three sides of the shoe, the blade spring is protected from contacting any brackets or supports the tensioner may be attached to. This is beneficial, as metal-to-metal contact may contaminate the oil supply with metal particles. Finally, this construction offers increased strength in the shoe since the complete cross-section of the shoe, at both ends, carries the load from the spring. This results in a stronger shoe which is less likely to fail when in use.

For a better understanding of these and other objects and aspects of the invention, reference should be made to the following detailed description taken in conjunction with the accompanying drawings.

BRIEF DESCRIPTION OF THE DRAWINGS

FIG. 1 is a side view of a blade spring used in the present invention.

FIG. 2 is a plan view of the bottom side of a blade spring used in the present invention.

FIG. 3 is a side view of a shoe used in the present invention.

FIG. 4 is a plan view of the bottomside of a shoe used in the present invention along the line 4—4 of FIG. 3.

FIG. 5 is a view from the opposite side of the shoe shown in FIG. 3.

FIG. 6 is a perspective view of the present invention.

FIG. 7 shows a blade tensioner of the present invention wherein the shoe has not deformed from the load of the blade spring and the temperature of the engine and the chain is not being tensioned.

FIG. 8 shows a blade tensioner of the present invention wherein the shoe has deformed from the load of the blade spring and the temperature of the engine and the chain is being tensioned.

FIG. 9 is a sectional view of the present invention along the line 9—9 in FIG. 5.

FIG. 10 is a sectional view of the present invention along the line 10—10 in FIG. 5.

FIG. 11 is a sectional view of the present invention along the line 11—11 in FIG. 6.

DETAILED DESCRIPTION OF THE DRAWINGS

Turning now to the drawings, FIGS. 7 and 8 depict the invention as it is when used to tension a chain. The chain tensioner 1 is mounted to a support 2 by a fastener 3 through mounting hole 6 at end 4 so as to position the tensioner 1 alongside a chain 5. The second end 10 of the tensioner 1 is not fastened to the support 2 and is therefore capable of slidable movement along the surface 11 of the support 2. Specifically the tensioner 1 is positioned so that its convex side 12 bears against the chain 5. As seen in a comparison of FIGS. 7 and 8, the tensioner 1 tensions the chain 5 as the tensioner 1 becomes more arcuate, i.e. its shape changes in the directions 13 and 14. The degree to which the tensioner 1 becomes arcuate is dependent upon the temperature of the engine (not shown.) Specifically, the tensioner 1 is constructed from a blade spring 15 and a plastic shoe 20. The plastic shoe 20 is made from a material which will "creep" or deform upon experiencing a load at a high temperature. The blade spring 15 is mounted with the shoe 20 to provide a load thereto. Thus as the engine (not shown) increases in temperature, the shoe 20 becomes more arcuate, due to the load from the blade spring 15 and the heat from the engine heating the shoe 20, thereby providing tension to the chain 5. The present invention specifically concerns an improved blade spring 15 and a shoe 20 design which permits the blade spring 15 to be mounted to the shoe 20 and provide a load thereto without the use of cutouts in the blade spring or separate fasteners.

As seen in FIG. 6, the tensioner 1 is constructed from a blade spring 15 and shoe 20. As seen in FIGS. 1 and 2, the blade spring 15 is arcuately shaped at a first formation radius and rectangular. The length of the blade spring 15 is slightly less than the length of the pocket 21 of the shoe 20.

As shown in FIGS. 3-5 the shoe 20 is also arcuately shaped, although less arcuate than the blade spring 15. Specifically, the first formation radius of the blade spring 15 is less than the second formation radius of the shoe 20, as best seen in a comparison of FIGS. 1 and 3. The shoe 20 is made of a synthetic material, such as nylon, which will "creep" under elevated load at a high temperature. A material commercially available as nylon 6/6, for example, may be used. The features of a chain tensioner utilizing such a synthetic plastic material are set forth in Turner et al. U.S. Pat. No. 3,490,302, discussed above, the teachings of which are hereby incorporated by reference. The shoe 20 has a pocket 21 located across the concave side 22. The pocket 21 encapsulates the blade spring 15 on three sides as best seen in FIG. 9. Specifically the pocket 21 is comprised from the side wall 23, pocket bottom 24 and fence 25 of the shoe 20. The side wall 23 is substantially higher than the fence 25. The fence 25 is dimensioned to allow the blade spring 15 to be slid into the pocket 21 and thereafter remain, i.e. prevent the blade spring 15 from sliding back out of the pocket 21. Due to the relatively less arcuate shape of the shoe 20 than the blade spring 15, when the blade spring 15 is mounted in the pocket 21, the mid-portion 30 of the blade spring 15 abuts the mid-portion 31 of the pocket bottom 24, as best seen on FIG. 11. Located at each end of the pocket is a knurl 32 which defines a cavity 33. Specifically, the cavity 33 is formed from the side wall 23, pocket bottom 24, fence 25 pocket end wall 26 and the bottom surface 34 of the knurl 32 as best seen in FIG. 10. Each end of the blade spring 15, due to the relatively less arcuate shape of the shoe 20 than the blade spring 15, abuts against the bottom surface 34 of the knurl 32 located at each end of the shoe 20, as best seen in FIG. 11. In such a manner the blade spring 15 is retained in the pocket 21 and places a load to the shoe 20.

The blade spring 15 is installed into the shoe 20 as follows. The blade spring 15 is deformed until its arcuate shape corresponds to the shoe 20. The blade spring 15 is then inserted over the fence 25 and into the pocket 21. Upon release the blade spring 15 drops into position behind the fence 25. Each end of the blade spring 15 is retained by engagement with the bottom surface 34 of the knurl 32 and the fence 25. The fences 25 also serve the purpose of keeping the blade spring 15 from coming into contact with any brackets that the tensioner 1 may be attached to.

When the blade spring 15 is positioned in the shoe 20, as described above, the blade spring 15 wants to return to its original arcuate shape. Accordingly, the blade spring 15 places a load on the shoe 20 and this load assists in allowing the shoe 20 to deform or "creep", at a high temperature, to keep proper tension on the chain 5. The forces exerted by the blade spring 15 on each end of the shoe 20 are substantially equal due to the symmetrical design of the blade spring 15 and shoe 20. The stresses on the blade spring 15 are also substantially equal due to the symmetrical design of the blade spring 15 and the similar manner in which each end of the blade spring 15 is mounted or mechanically interlocked with the shoe 20.

The invention can be applied with particular advantage to internal combustion engine timing devices having only a short run of chain 5 between adjacent sprockets. The small forms of engines with push rods are normally of this type. FIGS. 7 and 8 show the chain tensioner in use to tension such a device. The tensioner 1 is positioned so that its convex side 12 bears against the chain 5. As seen in a comparison of FIGS. 7 and 8, the tensioner 1 tensions the chain 5 as the tensioner 1 becomes arcuate. The degree to which the tensioner 1 becomes arcuate is dependent upon the temperature of the engine (not shown.) Specifically, because the blade spring 15 places a load to the shoe 20 in the directions 13 and 14, and because the shoe 26 is made from a material which will deform upon a load at an elevated temperature, when the engine heats up and thereby increases the temperature of the tensioner 1, the blade spring 15 bends the shoe 20 as shown in FIG. 8., thereby providing tension to the chain. Of course, it is readily apparent that the present invention can be utilized to tension other types devices, besides the timing chains of an internal combustion engine.

The above description is given for the sake of explaining the basic features of the invention. Various substitutions and modifications, other than those cited, can be made without departing from the scope of the following claims.

What is claimed is:

1. A chain tensioner, comprising:
   a blade spring;
   a shoe adapted to impart tension to a chain, said shoe being formed of a plastic material, said material being capable of creep deformation when subjected to a load at an elevated temperature; and
   said shoe having a first end, a second end, and a pocket formed between said first end and said second end, said pocket being enclosed at said shoe first end and said shoe second end and along a first side of said shoe, said pocket being open along a second side of said shoe and including a fence portion to receive and contain said blade spring.

2. The tensioner of claim 1 wherein said fence has a height sufficient to prevent movement of said blade spring through said pocket open end after insertion.

3. The tensioner of claim 1 wherein said pocket extends substantially from said shoe first end to said shoe second end.

4. The tensioner of claim 3 wherein said blade spring extends from said pocket first end to said pocket second end.

5. The tensioner of claim 1 wherein said blade spring extends from said shoe first end to said shoe second end.

6. The tensioner of claim 1 wherein said blade spring includes a mid-portion, said blade spring mid-portion contacting said shoe between said shoe first end and said shoe second end.

7. The tensioner of claim 1 wherein at least one of said shoe first end and said shoe second end includes a knurl, said knurl defining a cavity at an end of said pocket, said blade spring having an end contacting said knurl within said cavity.

8. The tensioner of claim 1 wherein said blade spring is arcuately shaped at a first formation radius.

9. The tensioner of claim 8 wherein said shoe is arcuately shaped at a second formation radius, said second formation radius being greater than said first formation radius.

10. The tensioner of claim 1 wherein said plastic material of said shoe is rigid heat stabilized nylon.

11. The tensioner of claim 1 wherein said pocket further having a side wall of said shoe, said fence being of less height than said wall.

12. A chain tensioner, comprising:
    a blade spring;
    a shoe adapted to impart tension to a chain, said shoe being formed of a plastic material, said material being capable of creep deformation when subjected to a load at an elevated temperature, said shoe having a first end, a second end, and a blade spring containing pocket formed between said first end and said second end, said pocket extends substantially from said shoe first end to said shoe second end, said pocket being enclosed at said shoe first end and said shoe second end and along a first side of said shoe, said pocket being open along a second side of said shoe to receive and contain said blade spring, said blade spring includes a mid-portion, said blade spring mid-portion contacting said shoe between said shoe first end and said shoe second end when contained within said pocket, said pocket open end includes a fence portion, said fence portion being of sufficient height to prevent movement of said blade spring through said pocket open end after insertion, wherein at least one of said shoe first end and said shoe second end includes a knurl, said knurl defining a cavity at an end of said pocket, said blade spring having an end contacting said knurl within said cavity; and
    said shoe including a support member, said support member being adapted to retain said shoe first end so that said shoe will bear against said chain and maintain said chain in tension.

13. The tensioner of claim 12 wherein said blade spring is arcuately shaped at a first formation radius.

14. The tensioner of claim 13 wherein said shoe is arcuately shaped at a second formation radius, said second formation radius being greater than said first formation radius.

15. The tensioner of claim 12 wherein said plastic material of said shoe is rigid heat stabilized nylon.

16. A method for mechanically interlocking an arcuate blade spring to a substantially flat shoe of a blade type chain tensioner, comprising:
    providing a blade spring;
    providing a tensioner shoe containing a pocket having a fence portion;
    providing said pocket with a cavity at each end of said pocket;
    positioning said blade spring within said blade spring pocket; and
    positioning said ends of said blade spring within said cavities.

* * * * *